Patented Dec. 12, 1944

2,364,782

UNITED STATES PATENT OFFICE 2,364,782

MANUFACTURE OF ORGANIC SULPHONATES

Lawrence H. Flett, Hamburg, N. Y., assignor to Allied Chemical & Dye Corporation, a corporation of New York No Drawing. Application June 14, 1940, Serial No. 340,468

12 Claims. (Cl. 260—505)

This invention relates to the manufacture of detergent and related compositions comprising poly-component mixtures of alkylated aromatic sulphonates derived from complex hydrocarbon mixtures of mineral origin, such for example as crude petroleum and preferably petroleum fractions comprising not more than 25% of aromatic compounds.

In general the manufacture of the compositions in question involves forming the aromatic condensation product of a poly-component non-aromatic hydrocarbon mixture of mineral origin by condensing an aromatic compound with a chlorinated petroleum fraction, or an olefinic product obtained by removing HCl from the chlorinated fraction, and sulphonating the poly-component mixture of alkyl-aromatic compounds thus produced. The alkyl groups introduced into the aromatic nucleus are principally hydrocarbon groups containing at least seven carbon atoms per molecule and the poly-component mixtures may comprise isomeric and homologous hydrocarbon groups. In addition to straight chain and branched chain alkyl groups, aralkyl and cycloalkyl groups may be present. The aromatic nucleus may be a benzene, napthalene, or diphenyl nucleus which may contain one or two substituents of the group consisting of halogens and hydroxy, alkoxy, alkyl, and phenoxy radicals.

When a complex hydrocarbon mixture of mineral-oil origin is treated in the above manner to give a mixture of sulphonates of poly-component alkyl aromatic compounds, there are formed colored impurities which contaminate the sulphonate mixture. Not only are the resulting detergents visually unattractive but goods washed with such detergents may be stained or discolored thereby. Even slight staining of washed goods is obviously objectionable.

The present invention has for an object improvement in the quality of alkyl aryl sulphonates of the type discussed above and especially to produce such sulphonates in a purer form and of better color than obtainable by simple sulphonation.

In accordance with the present invention poly-component alkyl-aromatic compound mixtures of the type defined above are subjected prior to sulphonation to a preliminary extraction or purification treatment with a concentrated form of sulphuric acid, which hereinafter is termed a "sulphuric extractant." The sulphuric treatment may be conducted by agitating the alkyl-aromatic compound mixture with sulphuric acid having a concentration between 80% $H_2SO_4$ and 26% oleum.

The sulphuric treatment effects some sulphonation. However, this does not cause a substantial loss in yield of the desired alkyl-aromatic sulphonates, as long as excessive dilution of the sulphuric extractant is avoided, since the desired alkyl-aromatic sulphonates are held mainly in the unsulphonated alkyl-aromatic oil.

It is preferred to conduct at least one extraction under conditions which restrict sulphonation to between 5% and 25% of the oil. Sulphonation may be restricted by limiting the quantity of sulphuric acid or oleum used, for instance by employing an amount of 100% sulphuric acid which does not exceed 20% of the weight of the alkyl-aromatic mixture to be treated, or by employing a diluent, as by employing aqueous sulphuric acid of a concentration in the neighborhood of 80% $H_2SO_4$, or otherwise limiting the conditions which determine the intensity of the reaction, for instance, the time and temperature thereof.

The extraction treatment essentially involves intermingling the poly-component alkyl-aromatic mixture to be purified with the sulphuric extractant and separating the extract phase from the unreacted alkyl-aromatic phase. Several successive extractions may be used but in general one is sufficient. In the event that, because of the concentration of acid or oleum employed, sharp separation into two liquid phases does not occur, addition of a small amount of water, for instance in the form of dilute sulphuric acid, will assist in establishing a sharp separation of the sulphuric acid phase. The quantity of water added in this way is preferably limited in order to deter passage of sulphonated alkyl-aromatic compounds into the sulphuric acid phase.

The present invention is of value in the purification of a poly-component alkyl-aromatic compound mixture derived from a poly-component hydrocarbon mixture of mineral origin such as a petroleum distillate or an otherwise refined petroleum fraction which contains straight and/or branched chain alkanes and which may also contain cyclo-alkanes and aryl hydrocarbons but does not contain more than 20% of aryl hydrocarbons. Preferably the poly-component alkyl-aromatic compound mixture is derived from a hydrocarbon mixture of mineral origin which contains less than 10% of aryl hydrocarbons. In any case, the poly-component mixture of mineral origin preferably consists predominantly of open chain alkanes.

The present invention is of particular value in the purification of the poly-component alkyl-aromatic compound mixtures derived from kerosene fractions, especially kerosene fractions of a Pennsylvania grade crude, as described for example in my United States Patents 2,233,408 and 2,283,199, and the invention hereof will be described particularly with reference to purification of this type of product. The present application is in part a continuation of my application Serial No. 195,414, filed March 11, 1938, upon which Patent 2,233,408 was issued.

One method for the manufacture of wetting, dispersing, emulsifying, and cleaning agents from kerosene and similar distillate fractions involves chlorinating a selected distillate fraction, for example a fraction of Pennsylvania or similar petroleum kerosene, so selected that the hydrocarbons therein contain for the most part between 7 and 19, and preferably from 10 to 16 carbon atoms to the molecule, to obtain a mixture which comprises chlorinated hydrocarbons, and which for convenience may be called a keryl chloride. The keryl chloride is then condensed with an aromatic compound, for example benzene, naphthalene, diphenyl, phenol, cresol, phenetol, toluene, or hydroxydiphenyl, to form a corresponding keryl-aryl compound, e. g., keryl-benzene, keryl-phenol, etc. The "keryl" groups of these keryl-aryl compounds, when derived from Pennsylvania oils, are chiefly open chain aliphatic hydrocarbon groups. The keryl-aryl compounds may be refined by fractional distillation and then may be sulphonated.

While compositions prepared by the above procedures, either in the form of free acids or their sodium, potassium, ammonium, alkyl-ammonium, or hydroxy-alkyl-ammonium salts, are valuable detergents, they are not colorless and may possess a sufficiently strong color to be definitely objectionable. By means of the preliminary purification treatment of the present invention, products of substantially improved color are obtained.

It is preferred to conduct the purification with sulphuric acid of 95% to 100% $H_2SO_4$ concentration. Treatments with acids of such strengths give the desired purification quickly and without appreciable loss of yield. Moreover, subsequent separation of the treating acid from hydrocarbon is easily controlled. Preferably an amount of sulphuric acid between 5% and 20% by weight of the treated oil is employed and the extraction or treatment is conducted at a temperature between 10° and 40° C. It is advantageous to avoid contact of the sulphuric acid hydrocarbon mixture with heavy metals and for this reason it is preferred to conduct the treatment in apparatus constructed of glass, stoneware, vitreous enamel, or the like.

The purification process of my invention depends upon the ability of the sulphuric extractant to react with and to form products soluble in sulfuric acid from certain undesirable impurities which apparently are relatively reactive with oleum or concentrated sulphuric acid. However, it should be understood that where in the appended claims reference is made to extraction, it is not intended to limit the process to any particular theory of purification and it is intended to include operations of the type described whether they depend for their efficacy upon reaction plus extraction or merely upon simple extraction.

The following examples illustrate the practical application of the invention.

EXAMPLE 1

10 ccs. of 100% sulphuric acid were charged to the first, 10 ccs. of 20% oleum were charged to the second, and 10 ccs. of 80% sulphuric acid were charged to the third of three 100 gram samples of distilled keryl benzene (distillation range—135° C. at 50 mm. absolute to 270° C. at 35 mm. absolute and made by chlorinating a Pennsylvania kerosene of 0.790 specific gravity at 24° C. until the specific gravity of the chlorinated kerosene was 0.920 at 24° C., condensing the chlorinated kerosene with excess benzene by means of anhydrous aluminum chloride, and separating the liquid portion from the tarry aluminum chloride residue). Each mixture was agitated for about 45 minutes without external heating or cooling. It was then poured into a separatory funnel, allowed to stand for a ½ hour to separate, and the lower, colored, acid layer was drawn off and discarded.

Each of the acid treated samples of the keryl benzene and a fourth sample of the untreated keryl benzene were then placed in glass sulfonating flasks and to each of the four samples were added 72 ccs. of 100% sulphuric acid, run into the agitated sample during 10 minutes; sulphonation was completed by warming each mixture to between 55° and 60° C. and maintaining the agitated batch within this temperature range for one hour. Each mixture was transferred to a separatory funnel and allowed to stratify for one hour; the middle layer of keryl benzene sulphonic acid was separated from the lower layer of spent sulphonating acid, and the top layer of unsulphonated hydrocarbon.

The sulphonic acid layer of each example was drowned in about 200 grams of ice and neutralized with about 70 ccs. of 50 per cent caustic soda; additional ice was added as necessary to keep the temperature below 35° C. To the neutral solution sufficient $Na_2SO_4$ was added to bring the inorganic salt content of the solute to 68%. Each of the four neutral aqueous solutions with solutes thus adjusted was drum-dried. The four samples of final detergent mixtures were then subjected to comparative tests. The results of these tests are given in the table on page 3.

The data of Example 1 show that the sulphuric acid preliminary treatment improves the color of the final detergent mixture and of its solutions without adversely affecting the wetting or detergent qualities of the product. In this particular example the keryl benzene even before purification by a sulphuric washing according to this invention gave, when sulphonated, a detergent which had a fairly light color; that is to say, the keryl benzene had been made in such a way as to contain only small amounts of color-forming substances. Nevertheless, the purification treatment very effectively reduced the content of color-forming materials therein to the extent that the color of its final sulphonated product was much less than that of the sulfonated product from the same keryl benzene which was not treated, and therefore the lighter-colored product was much more useful and desirable for washing fine fabrics.

The data of the table in Example 1 also show that the yields of valuable detergent products were substantially unaffected when the keryl benzene was treated with 80% or 100% sulphuric acid. Even a treatment with 20% oleum reduced the yield of final product by less than 8% of the yield obtained from the keryl benzene which was not given a sulfuric treatment. From these illustrations it is evident that the sulphuric treatment not only is effective in removing color-forming substances, but substantially eliminates undesirable substances with little or no deleterious effect upon or removal, from the material undergoing treatment, of those components which it is desired to sulfonate to produce the valuable detergent products.

TABLE

*Showing the effects, on quality of a sodium keryl benzene sulphonate, of a sulphuric acid treatment applied to the keryl benzene before sulphonation*

| Sample No. | Strength of $H_2SO_4$ extractant | Yield of mixture in grams | Relative color in solution (a) | Wetting time in seconds (b) | Detergency (c) | |
|---|---|---|---|---|---|---|
| | | | | | Soft water | Hard water (12°) |
| 1 | 100% $H_2SO_4$ | 211 | 0.95 | 41 | 25 | 44 |
| 2 | 20% oleum | 194 | 0.85 | 30 | 26 | 41 |
| 3 | 80% $H_2SO_4$ | 216 | 2.10 | 39 | 28.5 | 44.5 |
| 4 | This sample was not treated with $H_2SO_4$. | 210 | 2.60 | 40 | 26 | 41 |

(a) The method of comparing colors of solutions and determining the numerical values of colors as given in the above table is as follows:
An aqueous solution containing a known weight, say 5 grams of detergent per 100 ccs. of solution, and a similar solution of a standard light-colored detergent are compared in rectangular 4-oz. clear glass bottles by reflected light from a white background. If the solution of the sample is darker than that of the standard, 100 ccs. of the former are diluted until the color of the diluted solution is substantially equal to that of the standard; similarly, if the standard solution is the darker, 100 ccs. thereof are diluted until the diluted solution and that of the sample undergoing test are equal. When the aqueous solutions of the sample detergent and of the standard detergent are substantially equal in color, the quotient Y/X is determined, X representing the weight of sample detergent in 100 ccs. of solution, and Y representing the weight of standard detergent in 100 ccs. of solution. The value recorded in column (a) is the quotient Y/X.
(b) Wetting power was measured by determining the length of time necessary to wet out a standard size sample of standard fabric with a solution of the detergent at definite pH, temperature and concentration. 500 ccs. of a 0.2% solution of the detergent to be tested is placed in a 600 ccs. beaker and maintained at 50° C. A #10 canvas disc, 1 inch in diameter, is placed on the surface of the solution and immediately cupped in a long-stem inverted funnel and forced below the liquid level to a depth of 5 to 6 centimeters. The time from cupping until the disc commences to fall out of the funnel is measured and is given as the wetting time.
(c) Detergency was determined by wool washing tests conducted as follows:
A sample of wool cloth is uniformly soiled with lampblack, tallow, and mineral oil. It is then cut into pieces of approximately equal size (4" x 4"), which are washed in a Launder-o-meter in 200 ccs. of a 0.2% solution of the several products for a standard period of 30 minutes at 50° C. The degree of washing is determined by taking readings of reflected light (brightness) with a Zeiss-Pulfrich photometer. The tabulated value for detergency is the increase in brightness, i. e., the difference between the readings obtained with the photometer on the soiled, unwashed cloth and on the soiled cloth after washing.

EXAMPLE 2

Proportions are expressed as parts by weight.
*Section 1.*—A kerosene fraction of Pennsylvania petroleum distillate, substantially all of which boiled between 180° and 300° C., having a specific gravity of 0.790 at about 25° C. and consisting principally of saturated aliphatic hydrocarbons which, on the basis of the source and properties of the distillate, were considered to be hydrocarbons (mainly open chain aliphatic hydrocarbons) having an average molecular carbon content of 13 to 14 carbon atoms and a range from 10 to 17 carbon atoms per molecule, was chlorinated by passing into it a stream of chlorine gas in the presence of a small amount of iodine as a catalyst while maintaining the temperature of the mixture around 55° to 60° C., until the specific gravity of the liquid had increased by 0.125. At this stage, about 1¼ times the amount of chlorine theoretically necessary to yield the monochlor substitution products of the hydrocarbon mixture had been absorbed. The resulting chlorination product consisted of a mixture of monochlor hydrocarbons together with more highly chlorinated hydrocarbons and unchlorinated hydrocarbons.

*Section 2.*—10 parts of the chlorination product obtained according to Section 1, and comprising a mixture of monochlor hydrocarbons together with more highly chlorinated hydrocarbons and unchlorinated hydrocarbons, were reacted with 6 parts of benzene in the presence of 1.2 parts of anhydrous aluminum chloride, for about 45 minutes with vigorous agitation at 42° to 45° C. The reaction mixture was then allowed to stand for about two hours. It separated into two layers. The upper oily layer was decanted. It contained a mixture of higher alkyl benzenes resulting from the condensation, together with unreacted benzene, unreacted petroleum hydrocarbons and chlorinated petroleum hydrocarbons, and by-products of the reaction. The oil was heated in a still until the liquid temperature reached 150° C. After cooling slightly, vacuum was applied, and heating and distillation were continued until the vapor temperature reached 125° C. at 99 to 125 mm. mercury pressure, to remove from the distilland a distillate comprising chiefly unreacted benzene, with some low-boiling hydrocarbons and low-boiling by-products, while leaving behind an oil containing the higher-boiling alkyl benzenes and higher-boiling impurities.

*Section 3.*—7 parts of the remaining oil (comprising a mixture of the higher alkyl benzenes, together with other residual constituents and by-products of the foregoing procedure) were agitated at 30° to 40° C. with 1.4 parts of 100% sulphuric acid for about 45 minutes. After standing quiescent for one to two hours, the lower layer of spent acid was withdrawn. The remaining acid-treated oil was agitated with 9 parts of 100% sulphuric acid at 60° C. for about one hour. The reaction mixture was then allowed to stand quiescent until it separated into three layers (about one hour). The upper layer, consisting of oily material, was removed by decantation from the lower acid layers containing higher alkyl benzene sulphonic acids and residual sulphuric acid. Substantially all of the residual petroleum hydrocarbons and chlorhydrocarbons as well as the greater portion of the water-insoluble by-products formed in the condensation and sulphonation operations were present in the upper oily layer. The bottom sulphuric acid layer, containing principally spent sulphuric acid, was discarded. The original middle layer, containing the alkyl benzene sulphonic acids and some sulphuric acid, was drowned in about 50 parts of cold water, and neutralized with aqueous sodium hydroxide; for example, by treatment with a 50% aqueous solution of caustic soda in an amount sufficient to render the resulting solution neutral to Brilliant Yellow and Congo Red. The neutralized solution was evaporated to dryness on a rotary drum drier to produce a white flaked product which was readily soluble in water to form solutions that were clear and that possessed excellent wetting and washing properties. The product contained chiefly the sodium salts of alkyl benzene sulphonic acids, in which the alkyl groups averaged between 13 and 14 carbon atoms, and sodium sulphate.

EXAMPLE 3 (PARTS ARE BY WEIGHT)

One quarter part of iodine was dissolved in 503 parts of a Pennsylvania petroleum kerosene, which had a specific gravity of 0.789/24° C. and distilled completely in the range 208° to 280° C. at atmospheric pressure, with 80% of the distillate boiling between 233° and 267° C. With the iodine acting as a catalyst, the kerosene was chlorinated at a temperature between 25° C. and 60° C. by passing chlorine gas into the agitated kerosene at a rate of about 38 parts per hour for eleven hours, then adding 6 parts of phosphorus trichloride and continuing addition of chlorine gas until the chlorinated mixture had a specific gravity of 0.945/24° C., corresponding to a content of organically combined chlorine equal to about 120% of that required for monochlorination of the hydrocarbons (average empirical formula= $C_{14.5}H_{31}$) in the treated kerosene.

421 parts of this chlorinated mixture, 293 parts of phenol, and 40 parts of anhydrous zinc chloride were heated with agitation to 135° C. over a period of five to six hours, and agitated at 135° C. for about five hours. The mixture was agitated and cooled to 50° C. over a period of about ten hours, after which the mass was diluted and mixed thoroughly with about twice its weight of weak (6 to 8%) brine. The aqueous mixture was settled; the aqueous layer was withdrawn; the remaining oil was again mixed with weak brine, settled, and separated from the aqueous layer.

Three such condensations were made. Each of the three oils was distilled in vacuo, and the following fractions were collected and weighed separately:

Batch 1=the portion of the distillate collected from the point at which the vapor temperature in the still was 134° C./25 mm. until the temperature in the distilland reached 352° C./13 mm. The fraction weighed 279 parts.

Batch 2=the portion of the distillate collected from a vapor temperature in the still of 116° C./14 mm. to a temperature in the distilland of 350° C./14 mm. The fraction weighed 261 parts.

Batch 3=the portion of the distillate obtained from a vapor temperature in the still of 137° C./19 mm. to a temperature in the distilland of 350° C./28 mm. The fraction weighed 315 parts.

A composite of the three portions was made and distilled in vacuo. When the vapor temperature in the still was 256° C./26 mm., the distillate from this point up to a distilland temperature of 350° C./34 mm. was collected separately and considered to be chiefly a keryl phenol. A portion of this keryl phenol was used for the following further processing.

In a glass flask, 600 grams of the keryl phenol were agitated for 6 hours with 1524 ccs. of 80% sulphuric acid. The mixture was then allowed to settle and stratify. The lower layer of sulphuric acid, which had become colored, was withdrawn and discarded. The remaining keryl phenol was washed twice with water and then with soda ash solution to insure removal of all traces of acidity. The keryl phenol was then dried with anhydrous magnesium sulphate and filtered through filter cel. In a glass flask, 15 grams of the purified keryl phenol were thoroughly mixed with 8 ccs. of 100% sulphuric acid which was added slowly to the agitated oil while the temperature of the mixture was kept below 15° C. The completed mixture was allowed to warm up to 32° C. and then heated to 70° C. where it was kept for about 30 minutes. The mixture was drowned by pouring it on cracked ice; the aqueous mixture was neutralized with caustic soda to a pH between 6 and 7; the solution was then treated with a small amount of Norit (decolorizing charcoal) and dried on a drum drier. The dry product was a light-colored soluble, friable material comprising sodium keryl phenol sulphonate and sodium sulphate. It dissolved readily in water to form practically water-white solutions having excellent detergent qualities.

EXAMPLE 4

A large batch of the same type of kerosene used in Example 3 was rectified and the fraction boiling up to 91° C. under a pressure equal to 13 mm. of mercury was collected. Approximately 1 gram of iodine was dissolved in 1000 grams of this kerosene fraction which was adjusted to a temperature of 50° to 55° C. and chlorinated, while it was agitated, with a stream of chlorine gas passing into it. Chlorination was interrupted when the weight increase of the chlorinated kerosene fraction indicated that the amount of chlorine organically combined with the kerosene was 110% of that theoretically required for monochlorination of the hydrocarbons in it. A mixture of 300 grams of this chlorinated kerosene, 180 grams of naphthalene and 30 grams of anhydrous zinc chloride was agitated and heated at 170° C. for 16 hours. The condensation mixture was allowed to stand and settle; the oily layer was decanted from solid residue and distilled. The distillate boiling between 150° and 250° C. at 13 mm. of mercury was collected as the desired keryl naphthalene.

20 grams of the distilled keryl naphthalene were agitated for ½ hour, at room temperature, with an equal volume of 80% sulphuric acid. The mixture was allowed to separate, and the lower, colored acid layer was withdrawn and discarded. The acid-treated keryl naphthalene was sulphonated by agitating it with 20 ccs. of 100% sulphuric acid for an hour and half at 30° C. The sulphonation mixture was drowned in about 300 ccs. water, and neutralized with caustic soda solution, the temperature being kept below 40° C. during neutralization. The neutral aqueous solution of sodium keryl naphthalene sulphonate was drum dried to obtain a dry composition which dissolved readily in water to form substantially water-white solutions which had valuable detergent properties.

The following example illustrates the process conducted in large scale commercial apparatus:

EXAMPLE 5

10,620 pounds of Pennsylvania kerosene (boiling range 185° to 275° C.) were filtered through porous stoneware into a lead-lined kettle fitted with lead-covered agitator, thermometer well and other accessories. The agitated kerosene charge was warmed to about 60° C. and 4.4 pounds of iodine were dissolved in it. While the charge was maintained between 60° C. and 70° C., chlorine gas was passed into the liquid at an average rate of about 300 pounds per hour until the specific gravity of the chlorinated kerosene had changed from 0.788 at 24° C. before to 0.918 at 24° C. after the chlorination. The amount of chlorine required for the purpose was about 4825 pounds.

The final chlorinated kerosene mixture weighed about 12,834 pounds. The chlorinated hydrocarbon thus obtained was condensed in portions with benzene.

A mixture of 13,272 pounds of benzene and 332 pounds anhydrous aluminum chloride was agitated and 6636 pounds of the foregoing chlorinated kerosene mixture were added thereto over a period of three hours, during which the temperature of the mass rose to about 35° C. The mixture was then heated to 45° C. and held there for about 1½ hours. Agitation was then stopped, the mixture was allowed to stand for about 2 hours; thereafter the lower tarry layer was withdrawn. The upper layer was conveyed to a stripping kettle in which the liquid was stripped of low-boiling hydrocarbons, chiefly benzene, by boiling the liquid at 150° C. first under atmospheric pressure, and finally under reduced pressure down to a final absolute pressure of 3 to 4 inches of mercury. The material left after this stripping was distilled in vacuo until about 7% of the charge in the still had been removed as distillate. The remaining distilland was distilled, and distillate therefrom was collected separately until the boiling point of the distilland was 250° C. at 14 mm. of mercury pressure. This last distillate was chiefly the condensation product of the chlorinated hydrocarbons of the kerosene fraction and the benzene.

The keryl benzene was mixed with about 15% of its weight of 100% sulphuric acid, and the mixture was agitated for about one hour at about 40° C. The mixture was allowed to stand for about ½ hour to permit separation of the acid, which formed a lower layer and was withdrawn.

The upper, acid-treated layer of the keryl benzene was mixed with about 1¼ times its weight of 100% sulphuric acid at a temperature between 30° and 35° C. The mixture was then warmed to 55° C. and agitated at that temperature for one hour. It was then allowed to stand for two hours during which time three layers of material separated. The upper layer was chiefly unsulphonated material, the middle portion was chiefly sulphonated keryl benzene, and the lower layer was spent sulphuric acid. The middle layer was separated from the others, drowned in ice water, neutralized with an aqueous solution of caustic soda, and dried on a rotary drum drier. The properties of the product were similar to those of the product of Example 2.

By the term "a poly component non-aromatic hydrocarbon mixture of mineral origin" as employed in some of the following claims, I mean a hydrocarbon mixture such as petroleum and petroleum distillates or otherwise refined petroleum fractions containing straight and/or branched chain alkanes and which may also contain cyclo-alkanes and aryl hydrocarbons but do not contain more than 20% of aryl hydrocarbons.

I claim:

1. In the manufacture of a poly-component sulphonate product by the sulphonation of an alkyl-aromatic condensation product which contains a mixture of alkyl-aromatic compounds and has been obtained by chlorinating a liquid petroleum distillate from a Pennsylvania grade crude said distillate being a cut composed principally of hydrocarbons containing at least 7 but not more than 19 carbon atoms per molecule, and condensing the chlorinated distillate with an aromatic compound of the group consisting of mononuclear and dinuclear aromatic hydrocarbons and their mono- and di-halogen, -hydroxy, -alkyl, -alkoxy, and -phenoxy substitution products, the improvement which comprises subjecting said condensation product to a sulphuric extraction under such conditions that between 5% and 25% of the condensation product is sulphonated, separating the sulphuric extract from the condensation product, and sulphonating the separated condensation product.

2. In the manufacture of a poly-component sulphonate product by the sulphonation of an alkyl-aromatic condensation product which contains a mixture of alkyl-aromatic compounds and has been obtained by chlorinating a liquid petroleum distillate from a Pennsylvania grade crude said distillate being a cut composed principally of hydrocarbons containing at least 7 but not more than 19 carbon atoms per molecule, separating chlorination products from by-products by distillation, and condensing the chlorinated distillate with an aromatic compound of the group consisting of mononuclear and dinuclear aromatic hydrocarbons and their mono- and di-halogen, -hydroxy, -alkyl, -alkoxy, and -phenoxy substitution products, the improvement which comprises subjecting said condensation product to a sulphuric extraction under such conditions that between 5% and 25% of the oil condensation product is sulphonated, separating the sulphuric extract from the condensation product, and sulphonating the separated condensation product.

3. In the manufacture of a poly-component sulphonate product by the sulphonation of an alkyl-benzene condensation product which contains a mixture of alkyl-benzenes and has been obtained by chlorinating a liquid petroleum distillate from a Pennsylvania grade crude said distillate being a cut composed principally of hydrocarbons containing at least 7 but not more than 19 carbon atoms per molecule, condensing the chlorinated distillate with benzene, and removing light ends from the resulting alkyl-benzene condensation product by distillation, the improvement which comprises subjecting said alkyl-benzene condensation product to a sulphuric extraction under such conditions that between 5% and 25% of the oil condensation product is sulphonated, separating the sulphuric extract from the condensation product, and sulphonating the separated condensation product.

4. In the manufacture of a poly-component sulphonate product by the sulphonation of an alkyl-aromatic condensation product which contains a mixture of alkyl-aromatic compounds and has been obtained by chlorinating a liquid petroleum distillate from a Pennsylvania grade crude said distillate being a cut composed principally of hydrocarbons containing at least 7 but not more than 19 carbon atoms per molecule, and condensing the chlorinated distillate with an aromatic compound of the group consisting of mononuclear and dinuclear aromatic hydrocarbons and their mono- and di-halogen, -hydroxy, -alkyl, -alkoxy, and -phenoxy substitution products, the improvement which comprises subjecting said alkyl-aromatic condensation product to a sulphuric extraction with between 5% and 20% of its weight of 95% to 100% sulphuric acid at a temperature between 10° C. and 40° C., and separating the sulphuric extract from the condensation product prior to the sulphonation.

5. In the manufacture of a poly-component sulphonate product by the sulphonation of an alkyl-benzene condensation product which contains a mixture of alkyl-benzenes and has been obtained by chlorinating a liquid petroleum distillate from a Pennsylvania grade crude said distillate being a cut composed principally of hydrocarbons containing at least 7 but not more than 19 carbon atoms per molecule, condensing the chlorinated distillate with benezene, and removing light and heavy ends from the resulting alkyl-benzene condensation product by distillation, the improvement which comprises subjecting said alkyl-benzene condensation product to a sulphuric extraction with between 5% and 20% of its weight of 95% to 100% sulphuric acid at a temperature between 10° C. and 40° C. and separating the sulphuric extract from the condensation product prior to the sulphonation.

6. In the manufacture of a poly-component sulphonate product by sulphonation of an alkyl-aromatic product which contains a mixture of alkyl-aromatic compounds and has been obtained from a poly-component liquid hydrocarbon mixture of mineral origin composed principally of alkanes containing at least 7 but not more than 19 carbon atoms per molecule by replacement of a hydrogen atom thereof by an aromatic radical, the improvement which comprises subjecting said alkyl-aromatic product to a sulphuric extraction under such conditions that between 5% and 25% of the product is sulphonated, separating the sulphuric extract from the alkyl-aromatic product, and sulphonating the separated alkyl-aromatic product.

7. In the manufacture of a poly-component sulphonate product by sulphonation of an alkyl-aromatic product which contains a mixture of alkyl-aromatic compounds and has been obtained from a poly-component liquid hydrocarbon mixture of mineral origin composed principally of branched chain alkanes containing at least 7 but not more than 19 carbon atoms per molecule by replacement of a hydrogen atom thereof by an aromatic radical, the improvement which comprises subjecting said alkyl-aromatic product to a sulphuric extraction under such conditions that between 5% and 25% of the alkyl-aromatic product is sulphonated, separating the sulphuric extract from the alkyl-aromatic product, and sulphonating the separated alkyl-aromatic product.

8. In the manufacture of a poly-component sulphonate product by sulphonation of an alkyl-aromatic product which contains a mixture of alkyl-aromatic compounds and has been obtained from "a poly-component non-aromatic hydrocarbon mixture of mineral origin" composed principally of hydrocarbons containing at least 7 but not more than 19 carbon atoms per molecule by replacement of a hydrogen atom thereof by an aromatic radical, the improvement which comprises subjecting said alkyl-aromatic product to a sulphuric extraction with between 5% and 20% of its weight of 95% to 100% sulphuric acid at a temperature between 10° and 40° C., and separating the sulphuric extract from the alkyl-aromatic product prior to the sulphonation.

9. In the manufacture of a poly-component sulphonate product by sulphonation of an alkyl-aromatic product which contains a mixture of alkyl-aromatic compounds and has been obtained from a poly-component liquid hydrocarbon mixture of mineral origin composed principally of alkanes containing at least 7 but not more than 19 carbon atoms per molecule by replacement of a hydrogen atom thereof by an aromatic radical, the improvement which comprises subjecting said alkyl-aromatic product to a sulphuric extraction with between 5% and 20% of its weight of 95% to 100% sulphuric acid at a temperature between 10° and 40° C., and separating the sulphuric extract from the alkyl-aromatic product prior to the sulphonation.

10. In the manufacture of a poly-component sulphonate product by sulphonation of an alkyl-aromatic product which contains a mixture of alkyl-aromatic compounds and has been obtained from a poly-component liquid hydrocarbon mixture of mineral origin composed principally of branched chain alkanes containing at least 7 but not more than 19 carbon atoms per molecule by replacement of a hydrogen atom thereof by an aromatic radical, the improvement which comprises subjecting said alkyl-aromatic product to a sulphuric extraction with between 5% and 20% of its weight of 95% to 100% sulphuric acid at a temperature between 10° and 40° C., and separating the sulphuric extract from the alkyl-aromatic product prior to the sulphonation.

11. In the manufacture of a poly-component sulphonate product by the sulphonation of an alkyl-aromatic product which contains a mixture of alkyl-aromatic compounds and has been obtained from a kerosene fraction of Pennsylvania petroleum distillate, substantially all of which boils between 180° and 300° C., by replacement of a hydrogen atom thereof by an aromatic radical, the improvement which comprises subjecting said alkyl-aromatic product to a sulphuric extraction under such conditions that between 5% and 25% of the product is sulphonated, separating the sulphuric extract from the alkyl-aromatic product, and sulphonating the separated alkyl-aromatic product.

12. In the manufacture of a poly-component sulphonate product by the sulphonation of an alkyl-benzene condensation product which contains a mixture of alkyl benzenes and has been obtained by chlorinating a kerosene fraction of Pennsylvania petroleum distillate, substantially all of which boils between 180° and 300° C., condensing the chlorinated distillate with benzene, and removing light and heavy ends from the resulting alkyl benzene condensation product by distillation, the improvement which comprises subjecting said alkyl-benzene condensation product to a sulphuric extraction with between 5% and 20% of its weight of 95% to 100% sulphuric acid at a temperature between 10° and 40° C., and separating the sulphuric extract from the condensation product prior to the sulphonation.

LAWRENCE H. FLETT.

CERTIFICATE OF CORRECTION.

Patent No. 2,364,782. December 12, 1944.

LAWRENCE H. FLETT.

It is hereby certified that error appears in the printed specification of the above numbered patent requiring correction as follows: Page 1, first column, line 26, for "napthalene" read --naphthalene--; page 2, second column, line 54, for "washing" read --treatment--; page 5, second column, line 30, claim 2, and line 49, claim 3, strike out the word "oil"; and that the said Letters Patent should be read with this correction therein that the same may conform to the record of the case in the Patent Office.

Signed and sealed this 20th day of March, A. D. 1945.

Leslie Frazer (Seal)  Acting Commissioner of Patents.